US006726879B2

(12) United States Patent
Ng et al.

(10) Patent No.: US 6,726,879 B2
(45) Date of Patent: Apr. 27, 2004

(54) DUAL CHAMBERED FLUID SPECIMEN TESTING DEVICE AND METHOD

(75) Inventors: Waiping Ng, San Diego, CA (US); John Wu, San Diego, CA (US)

(73) Assignee: Ameditech, Inc., San Diego, CA (US)

( * ) Notice: Subject to any disclaimer, the term of this patent is extended or adjusted under 35 U.S.C. 154(b) by 0 days.

(21) Appl. No.: 10/150,736

(22) Filed: May 16, 2002

(65) Prior Publication Data

US 2003/0099572 A1 May 29, 2003

Related U.S. Application Data

(63) Continuation of application No. 09/862,235, filed on May 21, 2001.

(51) Int. Cl.[7] .................................... G01N 21/00

(52) U.S. Cl. .......................... 422/58; 422/61; 422/68.1; 436/180

(58) Field of Search ........................... 422/58, 61, 68.1, 422/50, 55, 56, 82.65, 102, 100, 104; 436/180, 164, 169

(56) References Cited

U.S. PATENT DOCUMENTS 5,595,187 A 1/1997 Davis
6,210,909 B1 4/2001 Guirguis
6,277,646 B1 8/2001 Guirguis et al.
2002/0009390 A1 1/2002 Lappe et al.

OTHER PUBLICATIONS

Product Flyer: American Bio Medica Corp. Drug Testing Products—Rapid Drug Screen.
Product Flyer: Drugcheck by Syntron Bioresearch, inc. No Step Drug Test.
Introducing the Revolutionary Clearchoice Pregnancy Test Cup by Phamatech, Inc.
Checkup by Applied Biotech, Inc. Product Flyer.
Scooper Drug Test Cup by Branan Medical Corporation Product Flyer.
Multi–Chamber Drug Test Cup by Pan Probe Biotech, Inc. Product Flyer.
Status et al. by LifeSign Product Flyer.

*Primary Examiner*—Jill Warden
*Assistant Examiner*—Sam P. Siefke
(74) *Attorney, Agent, or Firm*—Henri J.A. Charmasson; John D. Buchaca

(57) ABSTRACT

A fluid specimen collecting and testing device has two chambers each sealable by a lid. A first chamber has a portion of the specimen volume for carrying out a field test. A second chamber preserves an untainted portion of the fluid for more rigorous laboratory testing. A volume of fluid is temporarily allowed to pass from one chamber to the other through a sealable passageway. One lid carries one or more chromatic graphic reaction testing strips.

6 Claims, 6 Drawing Sheets

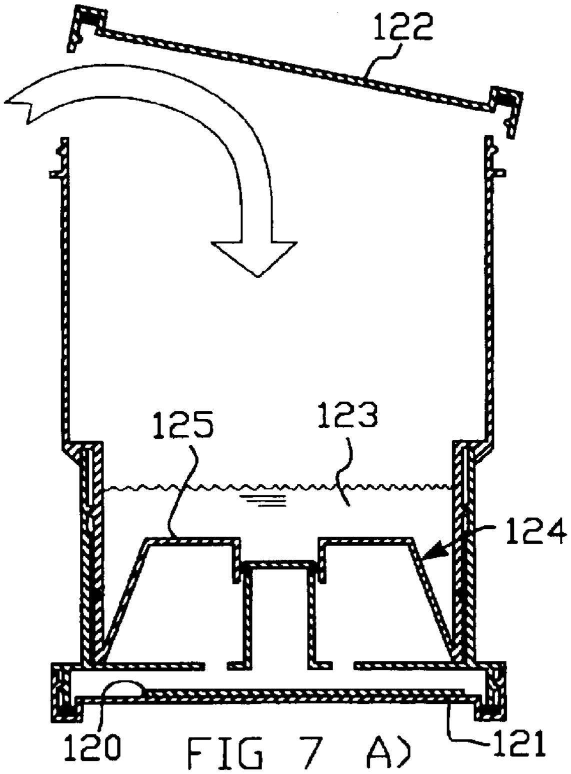
FIG 7 A)
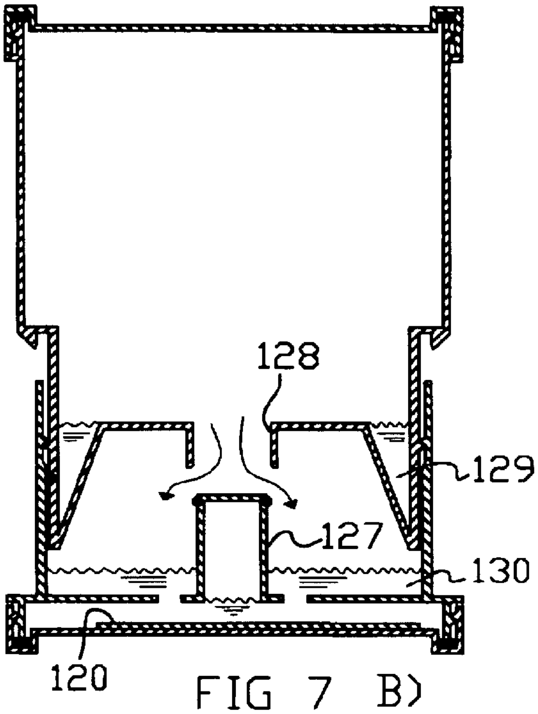
FIG 7 B)
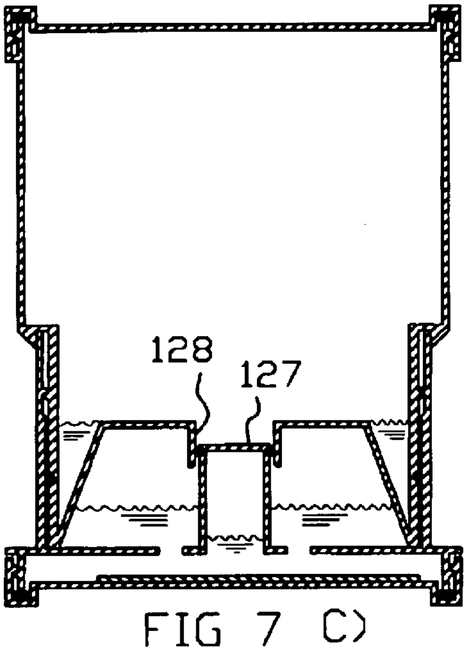
FIG 7 C)
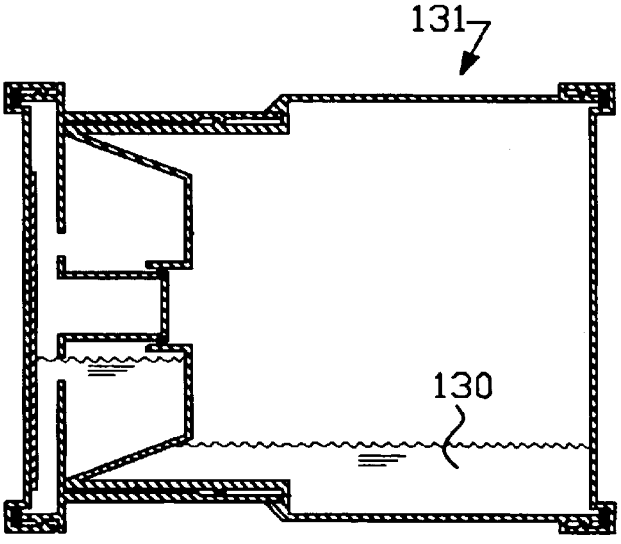
FIG 7 D)
FIG 7

DUAL CHAMBERED FLUID SPECIMEN TESTING DEVICE AND METHOD

PRIOR APPLICATION

This is a continuation of patent application Ser. No. 09/862,235 filed May 21, 2001 fully incorporated herein by this reference.

FIELD OF THE INVENTION

This invention relates generally to fluid specimen containers, testing devices for conducting chromatographic reaction tests using assay testing strips for fluid specimens and more particularly to sealed receptacles for holding fluid specimens and having testing capability.

BACKGROUND OF THE INVENTION

Fluid specimen jars or cups are commonly used to collect and test fluid specimens for the presence or absence of specific "indicators" which show the presence of specific chemicals, hormones, antibodies or antigens and are most commonly used for drug screening.

Collecting and testing fluid specimens carries a health risk for the person conducting the test and a contamination risk to the specimen or testing media. Testing devices as disclosed in Cipkowski U.S. Pat. No. 5,976,895 have required that a specimen be placed in a specimen cup and that a technician manually insert and submerge a portion of a testing strip into the specimen. With a potential for contact with the sample by the operator or technician and its associated health and contamination risks, a sealed receptacle for preventing contact is desirable. Various devices show further reduction in the risk of contact as in U.S. Pat. No. 4,976,923 to Lipsky et al., and U.S. Pat. No. 5,429,804 to Sayles, which utilize a one-step testing device, with chromatographic testing strips mounted in their lids. The initiation of the testing procedure may be further controlled by a frangible partition allowing passage of the fluid through to the test strips as described in Davis U.S. Pat. No. 5,119,830. All of the above-mentioned prior devices allow the specimen volume, as a whole, to be in contact with the test strip. In other words, the portion of the specimen in contact with the stips is also capable of contacting and intermingling with the remainder of the specimen.

Oftentimes, the results of a particular test will indicate that further more rigorous testing should occur. For example, if an initial test comes back positive for drug use, the conductors of the test may seek to conduct a more rigorous and accurate test to confirm the presence of the offending component. However, this secondary test cannot be performed on the fluid specimen as originally supplied because the first test exposed the specimen to the chemicals carried on the test strip. Such exposure allows for intermingling of chemicals carried on the test strip with the volume of specimen thereby contaminating it. In the past, this problem has been addressed by taking multiple specimens or being forced to take specimens removed in time from when the original specimen was taken. One can easily appreciate that the taking of a subsequent specimen after a prolonged period allows for changes in the physiology of the test subject. For example, a person suspected of taking drugs can cease drug use whereupon tests taken days later may not turn up positive.

Various specimen-collecting and testing jars have been proposed that provide for two amounts of the specimen to be separated from one another. In this way, the first amount can be subjected to the test strips without contaminating the second amount of fluid. Such devices suffer from being bulky, difficult to operate, expensive to manufacture and provide less that adequate amounts of fluid for conducting the test. For example, the device of Guirguis U.S. Pat. No. 6,277,646 provides for only a limited amount or aliquot of fluid for testing, thereby making it potentially difficult to adequately contact the multiple strips. Also, the introduction of the aliquot can increase pressure in the test chamber to a degree which can effect test accuracy.

Many tests require viewing of results in a specific time frame after the test is initiated. Therefore, it is preferable that the donor not initiate the test.

Increasingly, tests are being performed and evaluated by relatively unskilled technicians. Therefore, the device needs to be relatively simple to operate to insure adequate exposure of the test strip and to provide accurate results. Devices that require precise actions by the tester such as the proper orientation of the strips during testings are a source for additional error.

U.S. Pat. No. 5,403,551 Galloway requires inversion to an unspecified angle making engaging adequate submersion of the test strips difficult and uncertain. Further, testing chambers that allow the flow of fluid onto the test strip upon inversion, also allow the fluid to escape upon righting. Such action can encourage the trapping of air bubbles on the strip, thereby inhibiting the capillary action required by most test strips. Testing accuracy is often enhanced by proper orientation of the strips. Most prior devices do not provide for such orientation.

Because of the need to avoid contamination or even the appearance of possible contamination, it is desired that the specimen test cups be disposable. Therefore, to maintain low cost, it is important that efficient manufacturing methods, low cost materials and low cost designs are provided.

Presently, test results are viewed by examining the test strip directly and manually interpreting and recording the results. Therefore, these results can be subjective and without objective proof after the test strip has been used and/or discarded.

There is, therefore, a need to insure proper testing by allowing the test strips to be in continuous and controlled contact with the fluid sample, to properly orient test strips, to enhance the simplicity of the testing procedures, to prevent the formation of air bubbles adjacent to the strips, to maintain proper pressure in the test chamber, to be inexpensive to manufacture, to be flexible in accommodating different types of testing procedures, to provide for a portion of the specimen volume to be uncontaminated by the testing process, and to provide more objective recordation of test results.

SUMMARY OF THE INVENTION

The principal and secondary objects of this invention are to provide a flexible, cost effective fluid specimen testing device which can easily be filled, closed and the test conducted, and one which provides for a portion of the volume of fluid to be separated and maintained in an uncontaminated condition during and after testing is complete and one in which the results are recorded more objectively.

These and other valuable objects are achieved by fluid specimen testing device which has two chambers, each of which is sealable by a lid. A sealable passageway converts the two chambers and is operable by the tester which allows a portion of the fluid specimen to pass therethrough and, after sealing, to be separated from, and uncontaminated by, any testing done to the other portion of the fluid. Testing strips are mounted behind a top viewing window in one of the removable lids. The device is adapted to provide stability in an upright, inverted, or tilted on its side orientation. A roll-inhibiting feature acts as an indicator of proper roll orientation in the tilted position. The test strips are also oriented in the lid so that they are substantially vertical when the device is in the tilted position, thereby enhancing a condition for proper capillarity. The strips are mounted close to the lid's upper transparent surface which allows it to be copied on a flat glass copier providing for more objective recordation of test results. The opening and closing of the passageway is effected by a simple twisting motion between the threaded top portion and bottom portions of the cup. The top portion has a raised and shaped floor which provides a capture sump for keeping a portion of the specimen volume in the upper chamber while the passageway is open.

BRIEF DESCRIPTION OF THE DRAWING

FIGS. 7A–7D is a diagrammatic cross-sectional side view of the successive steps of an alternate testing process according to the invention.

DESCRIPTION OF THE PREFERRED EMBODIMENT OF THE INVENTION

Figure 1:
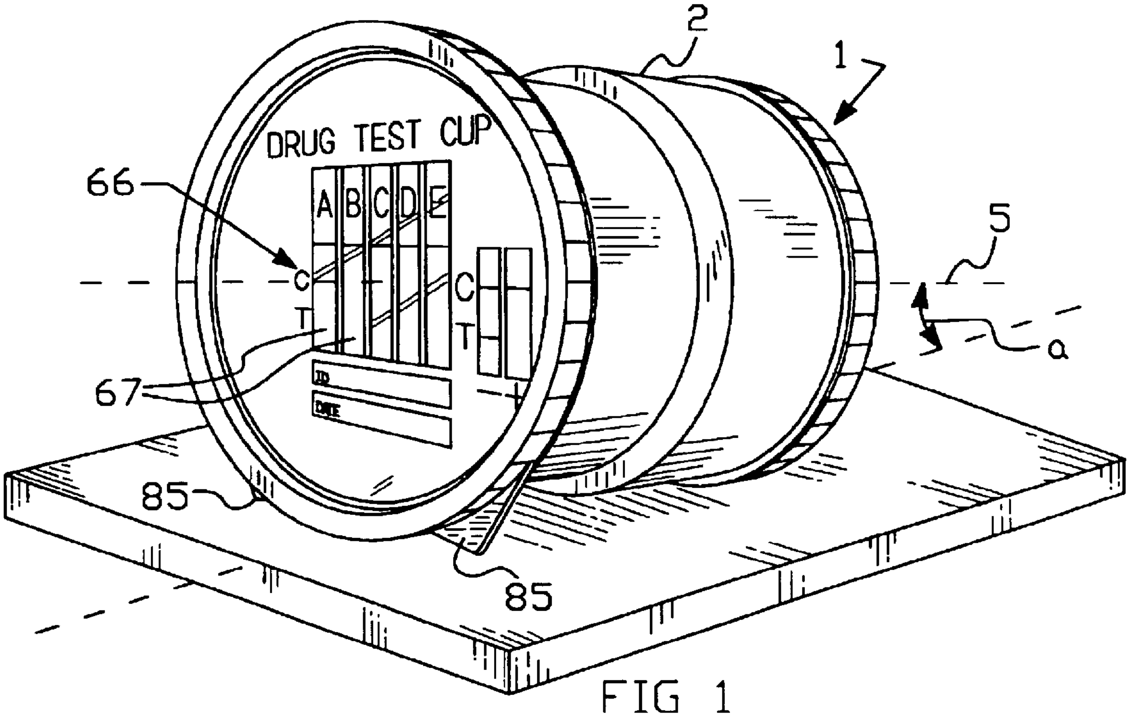
FIG. 1 is a diagrammatic perspective view of a specimen collecting and testing cup according to the invention in a tilted, test orientation.

Referring now to the drawing, there is shown in FIGS. 1–4, a fluid specimen collecting and testing cup 1 having a generally cylindrical body 2 divided into two interlocking and coaxially engaging portions 3,4 having a common relative axis of rotation 5. For clarity, the cup will be described with respect to its orientation in FIG. 2. The generally cylindrical top portion 3 is formed to have an upper end having a generally circular upper opening 6. The outer surface of the top portion near the opening is threaded 7 to allow sealing through use of a top lid 8. The generally cylindrical bottom portion 4 has a lower end having a generally circular lower opening 9 which is threaded 10 to allow sealing using a bottom lid 11. A radially extending flange 18 prevents axial movement of the upper lid 8 to a degree which would be over-tightening. A similar flange 19 extends radially from the bottom portion and is located to engage the upper peripheral edge 20 of the bottom lid 11. The top portion 3 has a threaded outer surface 15 to engage the threaded inner surface 42 of the bottom portion 4 along an interface zone 17.

The top portion 3 has a substantially cylindrical side wall 21 and a shaped bottom floor 22 opposite the upper opening 6 thereby bounding a top chamber 23. The floor 22 of the top portion is shaped to form a butte having a disk-shaped upper surface 24 and generally conically shaped skirt 25 extending downward and outward from a periphery 26 of the upper surface terminating a circular intersection 27 with the side walls 21 thereby forming an annular sump 28.

A generally cylindrical passageway 30 is formed axially and centrally through the bottom butte. A corresponding vertical cylindrical stopper 31 extends upward from a perforated web member 32 integral with the bottom portion 4 and positioned a distance "d" from the lower opening 9. The stopper is formed to engage within the passageway when the cup is in the "passageway closed" position. An upper peripheral O-ring 34 seals the gap between the pedestal and the passageway side walls, thereby preventing fluid from flowing through the passageway. The stopper 31 is supported by the web member 32 which has a plurality of perforations 33 allowing fluid passage from an upper subchamber 45 to a lower subchamber 46 of the bottom chamber.

Because the stopper, passageway and cup are coaxial, the stopper 31 engages and disengages the passageway 30 by axial movement between the top and bottom portions of the cup. Axial separation is caused by axially rotating in a first direction one portion in relation to the other thereby engaging spiral threads causing separation of the two portions to form the "passageway open" position. Opposite rotation causes closure into the "passageway closed" position. The cup is readily and successively interchangeable between these two positions. An outward indicator 34 of passageway status is printed on teh outer surfaces of the cap portions.

In this embodiment, the engagement of the stopper with the passageway decreases the volume of the lower chamber. Although this causes an increase in pressure, it is only a small amount since the change in volume is preferably less than about 25%, more preferably less than about 10% and most preferably less than about 5%. This enhances test accuracy.

The interface between the upper and lower cup portions is secured from fluid flow by means of an O-ring 40 circumferentially placed between the walls of the top and bottom portions.

Figure 2:
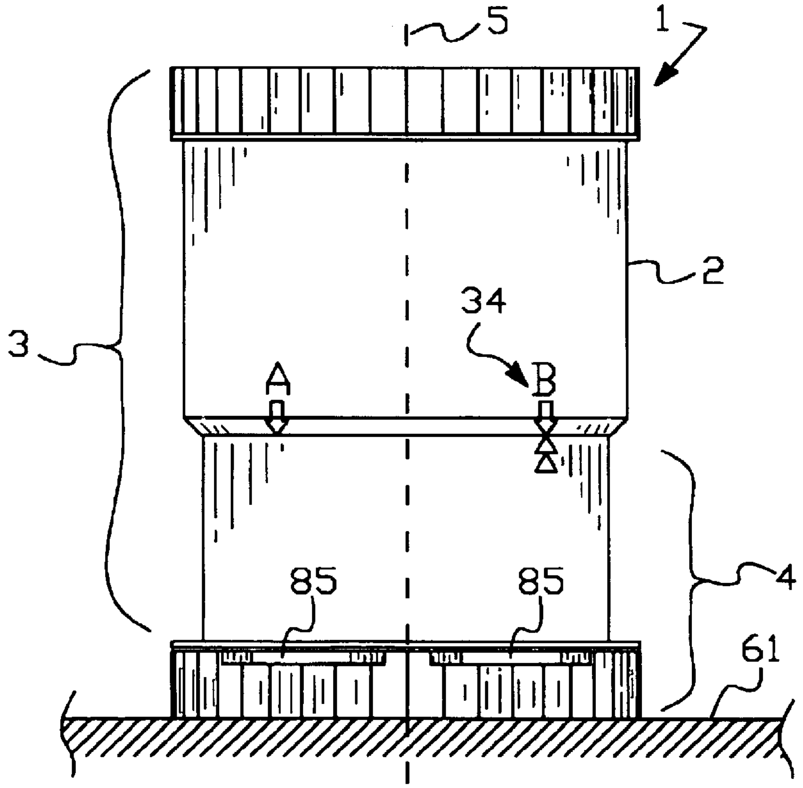
FIG. 2 is a diagrammatic side view of the cup of FIG. 1 in a vertical orientation.
Figure 3:
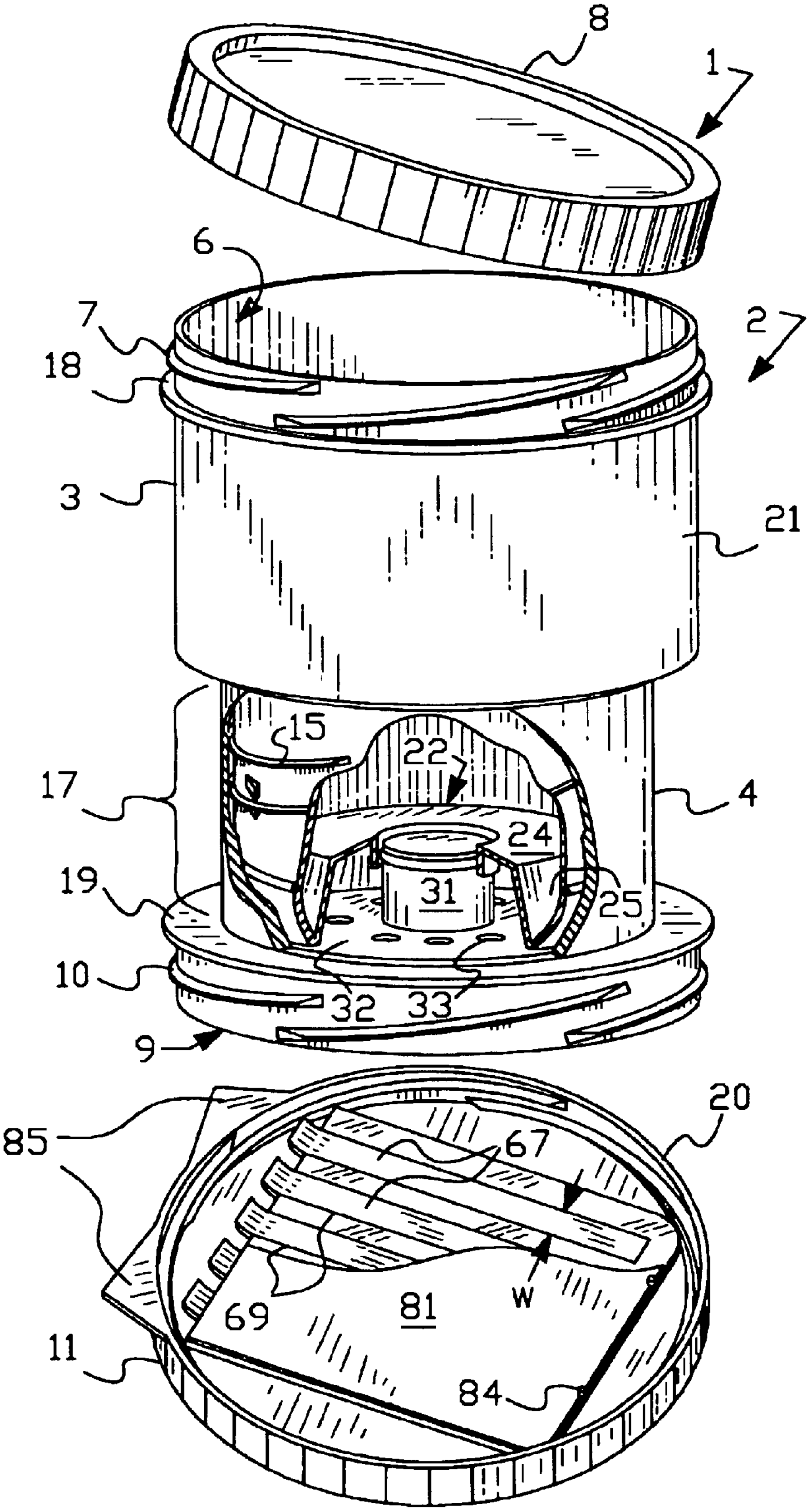
FIG. 3 is a diagrammatic partial cut-away perspective view of the cup of FIG. 1 in a vertical orientation.
Figure 4:
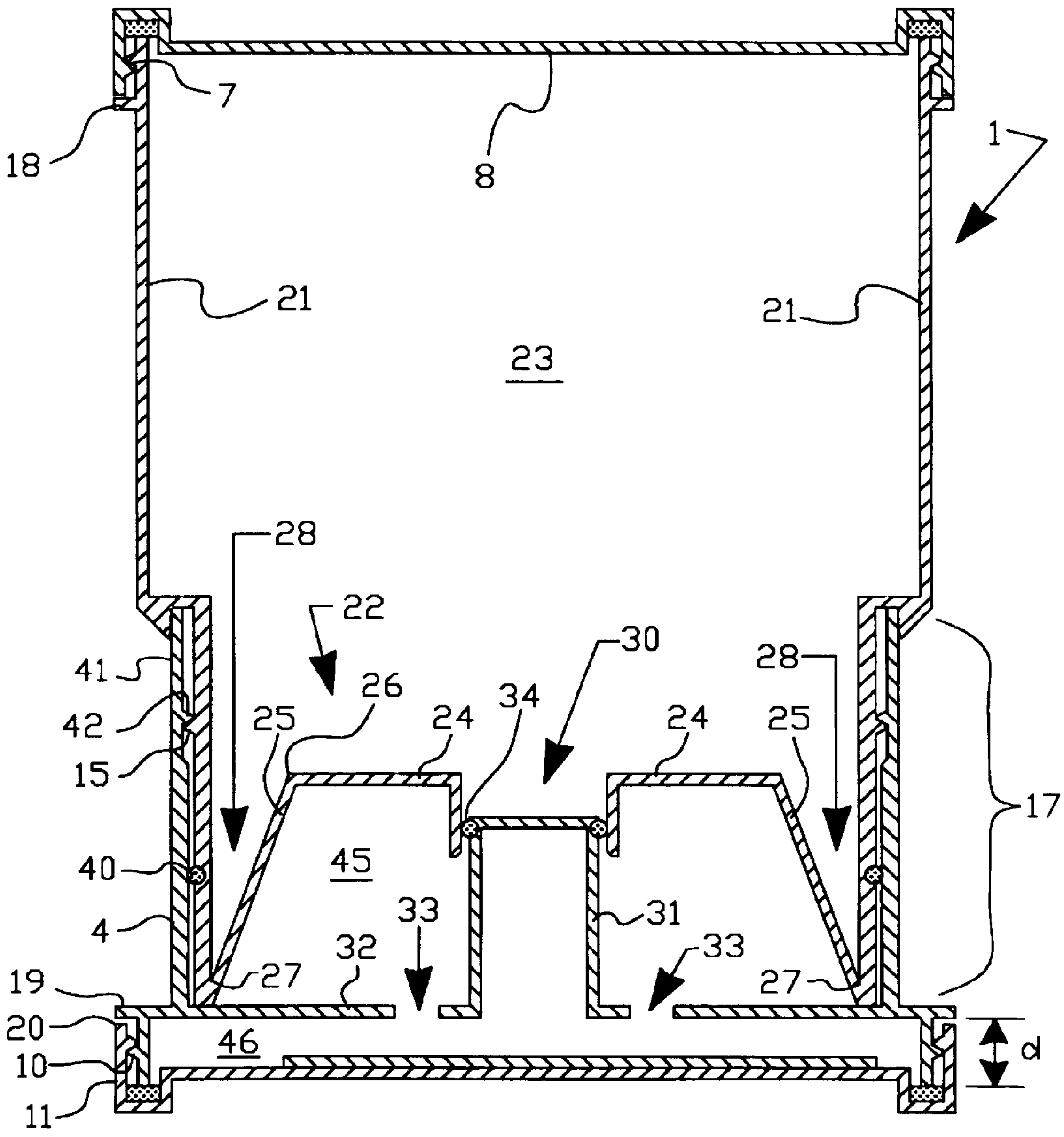
FIG. 4 is a diagrammatic cross-sectional side view of the cup of FIG. 1.
Figure 5:
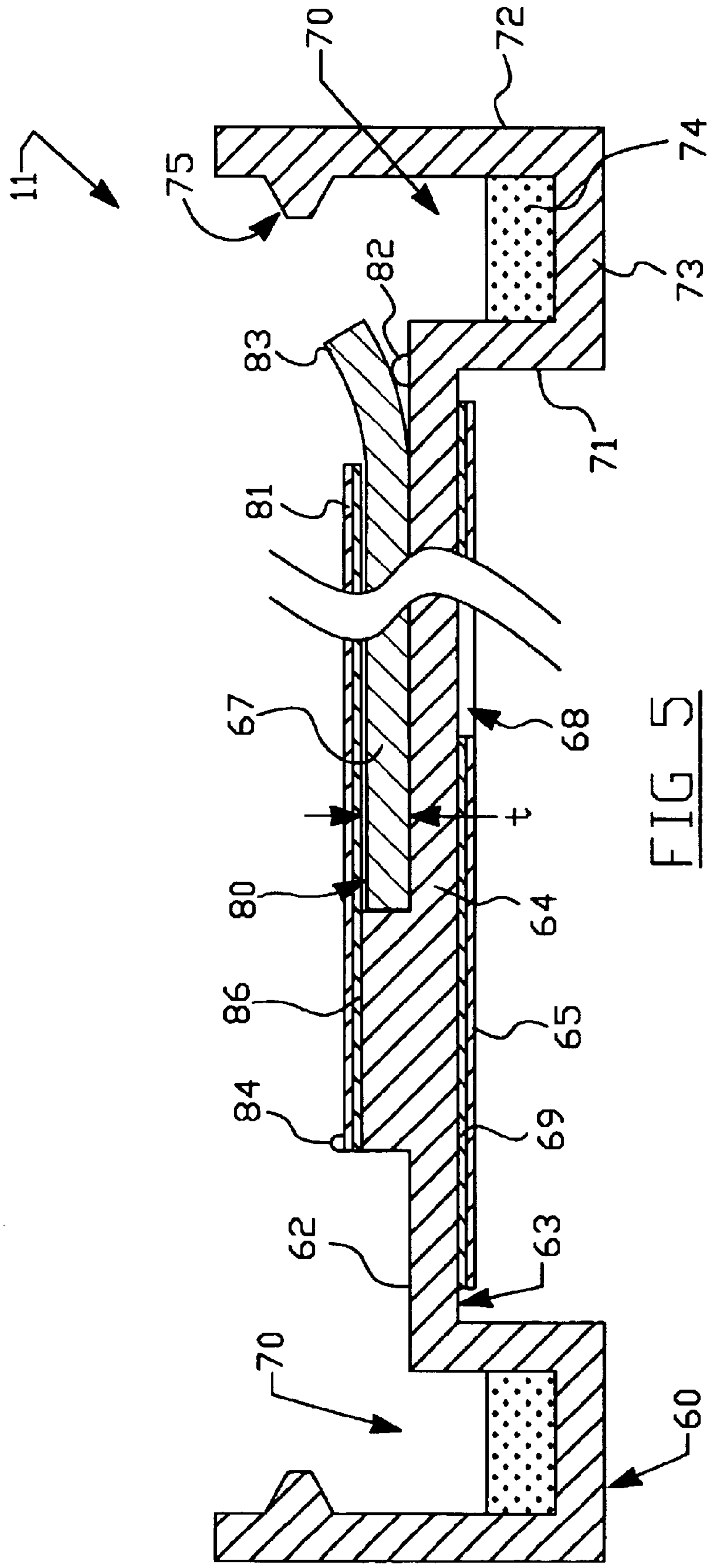
FIG. 5 is a diagrammatic cross-sectional side view of the test strip carrying lid according to the invention.

Referring now to FIGS. 1–3 and 5, the lower lid 11 is formed to carry a plurality of chromatographic test strips 67 and to have a substantially planar lower bearing surface 60 which allows the cup to rest on a substantially horizontal surface 61 in a stable upright position as shown in FIG. 2 wherein the major axis 5 is substantially vertical. For clarity, the lid is described with respect to its orientation in FIG. 5.

Those skilled in the art will readily appreciate the structures in a different orientation.

The lid has a substantially rigid, disk-shaped body portion 62 having a substantially planar outer, lower surface 63. The body is formed from substantially transparent material such as substantially clear polypropylene for forming a substantially transparent front pane 64. The pane is partially covered on the lower surface by an adhesive-backed 69 perforated placard 65 carrying written indicators 66 in FIG. 1 for reading the results on the strips and viewing perforation 68 located over the strips 67. The placard can also carry information including test identification and timetable, and other instructions. The disk-shaped portion is surrounded by a cylindrical channel 70 formed between cylindrical inner 71 and outer 72 walls and a disk-shaped channel bottom 73. The channel carries a rubber fluid-stopping washer 74. The outer wall 72 has inner threads 75 for engaging an opening of the cup.

The lid is further adapted to carry a number of chromatographic assay strips 67 each within a dedicated one of a plurality of oblong pockets 80 formed by parallel grooves 69 formed into the top surface of the pane 64, and a backing layer 81 of fluid impermeable material bonded by an adhesive layer 86 to the top surface of the pane adjacent to the grooves. An axially extending end nib 82 pushes the end portion 83 of the strip 67 upward to allow greater surface area for contact by the fluid. A placement indicia nib 84 exists extending axially upward from a top surface of the pane to guide placement of the retaining layer. Most preferably, the pockets are formed to have dimensions closely matching the width "w" and thickness "t" dimension of the oblong strips to inhibit the formation of bubbles.

As shown in FIG. 1, the pockets are positioned to orient the strips 67 in a substantially vertical orientation when the device is in a tilted test orientation where the major axis 5 is substantially parallel to the horizontal support surface. A pair of roll-inhibiting ears 85 extend radially from the outer cylindrical wall 72 of the lid to help stabilize the device and, thus, help prevent the test strips from rolling beyond their optimal vertical test orientation. The ears may also be adjusted in their size to maintain the device at a predetermined and optimum test angle where a contact point between the two ears and the opposite lid edge can pitch the major axis 5 at an up or down angle "a" from horizontal with the support surface. Other means well-known in the art may be employed to inhibit rolling motion. Pitch motion is prevented by the above-contacts.

Figure 6:
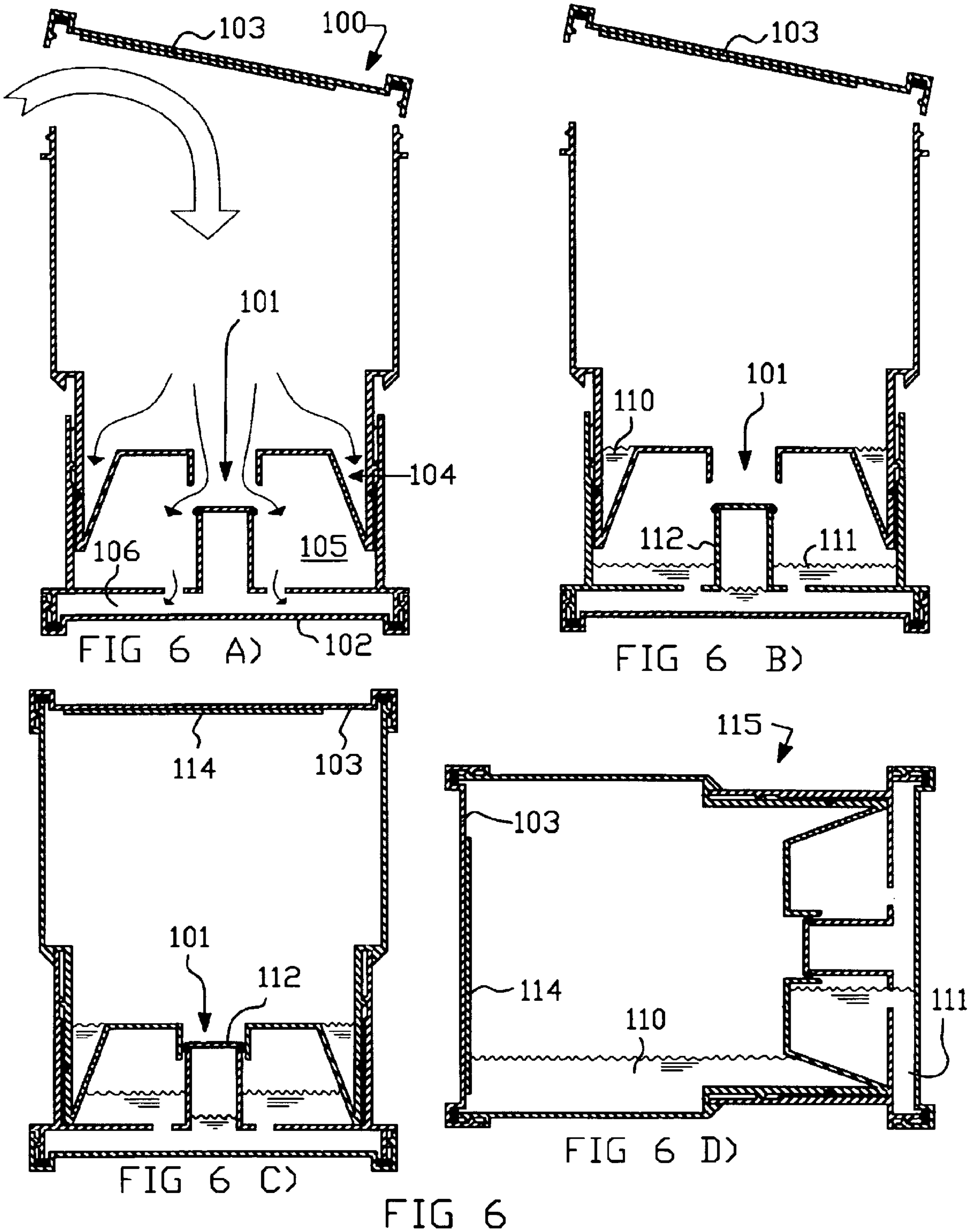
FIGS. 6A–6D is a diagrammatic cross-sectional side view of the successive steps of the specimen testing process according to the invention.

Referring now to FIGS. 6A–6D, it will be described a preferred embodiment for the method of carrying out a test according to the invention. As shown in FIG. 6A, the dual-chambered cup 100 is arranged in a configuration wherein the central passageway 101 is open, the bottom lid 102 is secured and the top lid 103 is off. Preferably, the cup is provided to the donor without the top lid which, in this embodiment, carries the test strips. Alternately, a lid without strips is provided to the donor. An amount of fluid specimen is placed into and through the upper opening of the top portion as indicated by the arrows and flows down into the annular sump 104 formed between the top portion side walls and the raised butte shaped floor. Further, an amount of the specimen fluid flows through the passageway 101 and into the lower chamber 105 and through the preforations 106 in the stopper carrying web, thereby filling the bottom section of the lower chamber.

In FIG. 6B, the fluid levels reach a quiescent state wherein a portion 110 of fluid remains in the sump of the upper chamber and another portion 111 remains in the lower chamber. This state is received from the donor. A top lid 103 carrying test strips is then secured onto the upper opening of the top portion of the cup and twisted on. The twisting motion also causes the relative twisting between the top and bottom portions of the cup causing axial contraction between the two portions, thereby inserting the stopper 112 into the passageway 101 and sealing the upper and lower chambers as shown in FIG. 6C.

The top lid 103 carries test strips 114 and, as shown in FIG. 6D, upon the tilting over of the cup into a sideways orientation 115, the amount of fluid 110 in the upper chamber flows against the test strips 114 to initiate the test. Importantly, the lower portion 111 of the fluid specimen is prevented from flowing from the second chamber and is held uncontaminated for future testing, if necessary.

Referring now to FIG. 7, there are shown an alternate embodiment of the testing method of the invention intended to greater control over test initiation wherein the assay test strips 120 are loaded into the lower lid 121. As shown in FIG. 7A, the lower lid 121 is secured to the lower opening of the lower portion of the cup and the upper lid 122 is off. A Fluid specimen 123 from a donor is then entered into the upper chamber as shown by the arrow and reaches a quiescent state filling the lower annular sump 124 and immersing the upper surface of the lower butte 125 below the amount of specimen.

Referring now to FIG. 7B, the two nested portions of the cup are axially extracted from one another by an unscrewing motion causing the stopper 127 to retract away from the passageway 128, thereby allowing a portion 130 of the specimen to flow from the upper chamber into the lower chamber of the cup initiating the test and resulting in a quiescent state where the upper annular sump is filled with a portion 129 of the specimen. The flow prevents backwash intermingling of the portions. The other portion 130 has flowed through the perforations and onto the test strips 120.

As shown in FIG. 7C, the two portions of the cup are then twisted in a tightening motion allowing axial penetration of the stopper 127 into the passageway 128 thereby sealing off the upper and lower chambers of the cup.

As shown in FIG. 7D, the cup is then tilted into a sideways orientation 131 for continued performance of the test while the upper chamber maintains a portion 130 of fluid uncontaminated and ready for future testing.

While the preferred embodiments of the invention have been described, modifications can be made and other embodiments may-be devised without departing from the spirit of the invention and the scope of the appended claims.

What is claimed is:

1. A fluid specimen collecting and testing cup comprises:

a first sealable chamber;

a second sealable chamber;

a sealable passageway between said chambers;

a first lid for sealing a first opening in said first chamber;

a second lid for sealing a second opening in said second chamber, wherein said first lid comprises a test strip;

wherein said first chamber comprises a non-planar bottom portion having a raised section shaped to have a passageway;

wherein said second chamber has a bottom portion having an upward extending stopper having an outer diameter sized to engage and seal said passageway;

wherein said stopper engaging said passageway decreases the volume of said second chamber; and wherein a decrease in volume of said second chamber between a passageway open condition and a passageway closed condition is less than 25%.

2. A fluid specimen collecting and testing cup comprises:

a first sealable chamber;

a second sealable chamber;

a sealable passageway between said chambers;

a first lid for sealing a first opening in said first chamber;

a second lid for sealing a second opening in said second chamber, wherein said first lid comprises a test strip;

wherein said first chamber comprises a non-planar bottom portion having a raised section shaped to have a passageway;

wherein said second chamber has a bottom portion having an upward extending stopper having an outer diameter sized to engage and seal said passageway;

wherein said stopper engaging said passageway decreases the volume of said second chamber; and wherein said cup is successively interchangeable between a passageway open condition and a passageway closed condition.

3. The cup of claim 1, wherein said cup further comprises an outward indicator for indicating an open/closed status of said passageway.

4. The cup of claim 1, wherein said first lid is sized and shaped to seal said second opening.

5. The cup of claim 2, wherein said cup further comprises an outward indicator for indicating an open/closed status of said passageway.

6. The cup of claim 2, wherein said first lid is sized and shaped to seal said second opening.

* * * * *